US012746798B2

(12) United States Patent
Pierres et al.

(10) Patent No.: US 12,746,798 B2

(45) Date of Patent: Sep. 29, 2026

(54) HEATING, VENTILATION AND/OR AIR-CONDITIONING DEVICE FOR A MOTOR VEHICLE

(71) Applicant: VALEO SYSTEMES THERMIQUES, La Verriere (FR)

(72) Inventors: Philippe Pierres, La Verriere (FR); Thierry Barbier, La Verriere (FR); Philippe Menin, La Verriere (FR); Nestor Ismael Varela Santoyo, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 672 days.

(21) Appl. No.: 17/918,927

(22) PCT Filed: Apr. 13, 2021

(86) PCT No.: PCT/EP2021/059486

§ 371 (c)(1),
(2) Date: Oct. 14, 2022

(87) PCT Pub. No.: WO2021/209409

PCT Pub. Date: Oct. 21, 2021

(65) Prior Publication Data

US 2023/0234420 A1 Jul. 27, 2023

(30) Foreign Application Priority Data

Apr. 15, 2020 (FR) ....................................... 2003802

(51) Int. Cl.
*B60H 1/00* (2006.01)

(52) U.S. Cl.
CPC ................................ *B60H 1/00671* (2013.01)

(58) Field of Classification Search
CPC ............ B60H 1/00671; B60H 1/00678; B60H 2001/00714; B60H 2001/3288;
(Continued)

(56) References Cited

U.S. PATENT DOCUMENTS 10,144,265 B2 * 12/2018 Kuwayama ........ B60H 1/00028
10,195,920 B2 2/2019 Kominami
(Continued)

FOREIGN PATENT DOCUMENTS

CN 105517819 A 4/2016
CN 108349347 A 7/2018
(Continued)

OTHER PUBLICATIONS

Japan Patent Office, Office Action (with English translation) of corresponding Japanese Patent Application No. 2022-562792, dated Feb. 2, 2024.
(Continued)

*Primary Examiner* — Ko-Wei Lin
(74) *Attorney, Agent, or Firm* — Osha Bergman Watanabe & Burton LLP

(57) ABSTRACT

A heating, ventilation and/or air-conditioning device for a motor vehicle, with a housing which includes a first duct for a first air stream, a second duct for a second air stream, a partition placed inside the housing so as to separate the ducts, a first heat exchanger arranged in the ducts, said heat exchanger being common to the two ducts, a second heat exchanger which is located downstream of the first heat exchanger and is arranged within a single duct, a first flap located downstream of the second heat exchanger, an air stream guide wall which is arranged inside the first duct, downstream of the first heat exchanger, and directs the first air stream in the direction of the first flap. The housing includes a space between the air stream guide wall and the
(Continued)

first flap so that the first flap will not abut against the air stream guide wall.

7 Claims, 2 Drawing Sheets

(58) Field of Classification Search
CPC .. B60H 2001/3289; B60H 2001/00092; B60H 2001/00085; B60H 1/00664; B60H 1/00842; B60H 1/00514
USPC .................................................. 454/142, 155
See application file for complete search history.

(56) References Cited

U.S. PATENT DOCUMENTS

| | | | | |
|---|---|---|---|---|
| 11,001,125 | B2 | 5/2021 | Goodfellow | |
| 11,613,155 | B2 | 3/2023 | Yamasaki | |
| 2017/0106716 | A1* | 4/2017 | Hirai | B60H 1/00028 |
| 2020/0180389 | A1* | 6/2020 | Yamasaki | B60S 1/023 |
| 2020/0238789 | A1* | 7/2020 | Kim | B60H 1/00007 |
| 2021/0155075 | A1* | 5/2021 | Rausch | B60H 1/00842 |
| 2022/0332167 | A1* | 10/2022 | Chikagawa | B60H 1/00021 |

FOREIGN PATENT DOCUMENTS

| | | | | |
|---|---|---|---|---|
| DE | 112014004822 | B4 | 5/2019 | |
| EP | 2174809 | A1 | 4/2010 | |
| JP | 2009029311 | A | 2/2009 | |
| JP | 2009119913 | A | 6/2009 | |
| JP | 2013052750 | A | 3/2013 | |
| JP | 201580959 | A | 4/2015 | |
| JP | 2018047711 | A | 3/2018 | |
| JP | 2018122847 | A | 8/2018 | |
| JP | 201943226 | A | 3/2019 | |
| JP | 2019156071 | A | 9/2019 | |
| JP | 2019156115 | A | 9/2019 | |
| KR | 20180001697 | A | 1/2018 | |
| WO | WO-2016125731 | A1 * | 8/2016 | B60H 1/00 |
| WO | 2018139033 | A1 | 8/2018 | |
| WO | WO-2019044302 | A1 * | 3/2019 | B60H 1/00064 |

OTHER PUBLICATIONS

European Patent Office, International Search Report (with English translation) and Written Opinion of corresponding International Application No. PCT/EP2021/059486, dated Jun. 29, 2021.

China Patent Office, Office Action of corresponding Chinese Patent Application No. 202180028036.9, dated Aug. 17, 2023.

Office Action issued in corresponding China Application No. 202180028036.9, dated Jan. 23, 2026. (8 pages).

* cited by examiner

[Fig. 1]
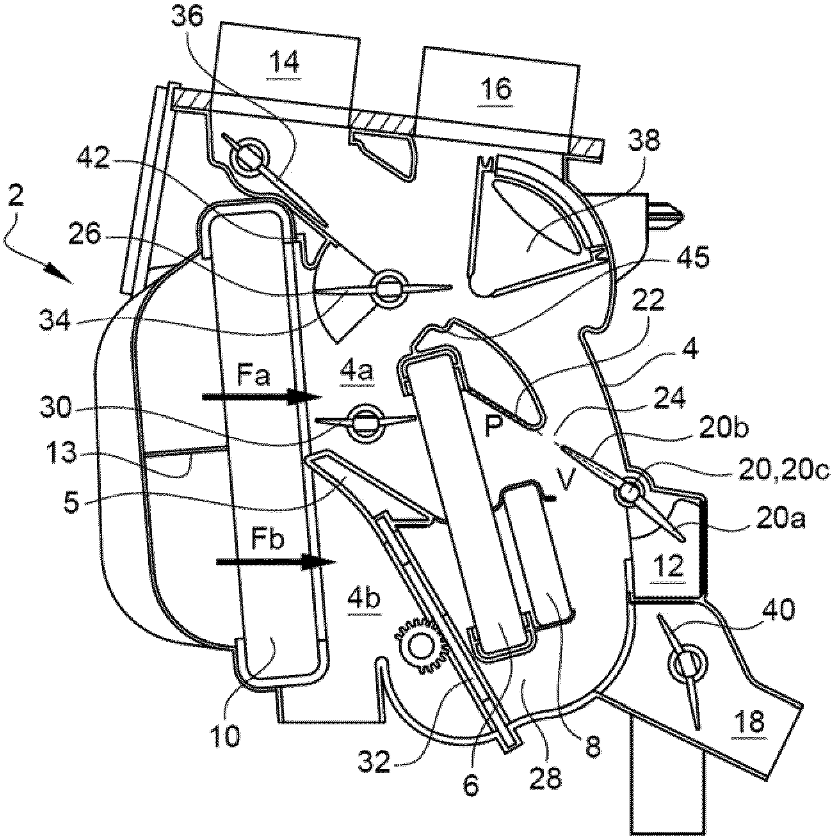
[Fig. 2]
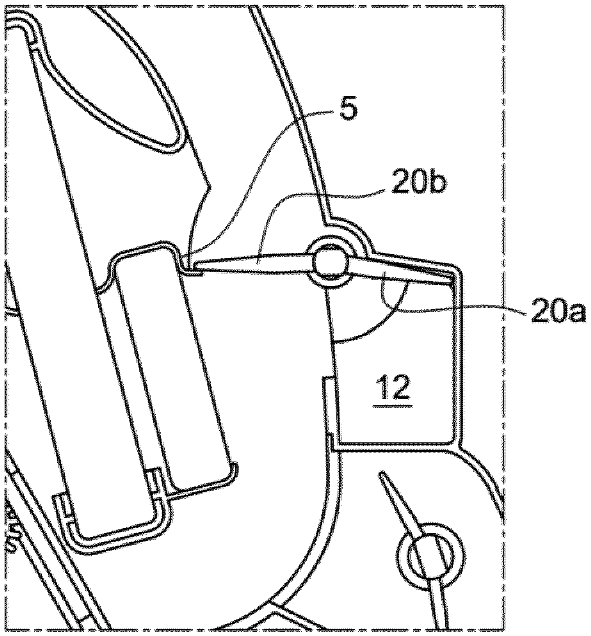

[Fig. 3]
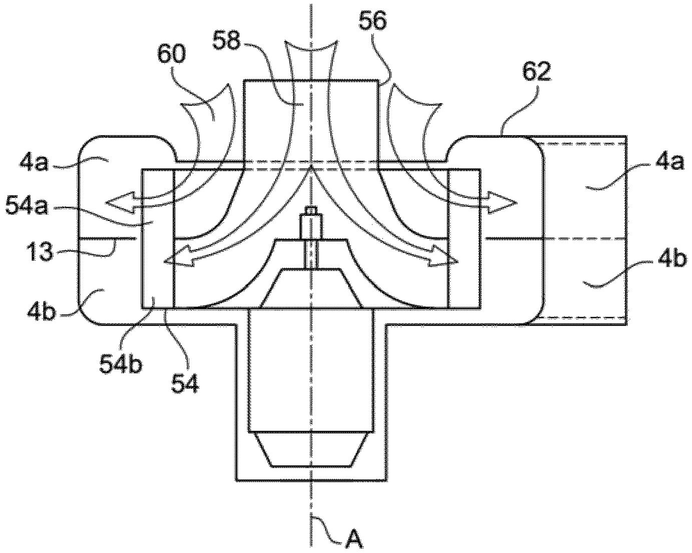
[Fig. 4]
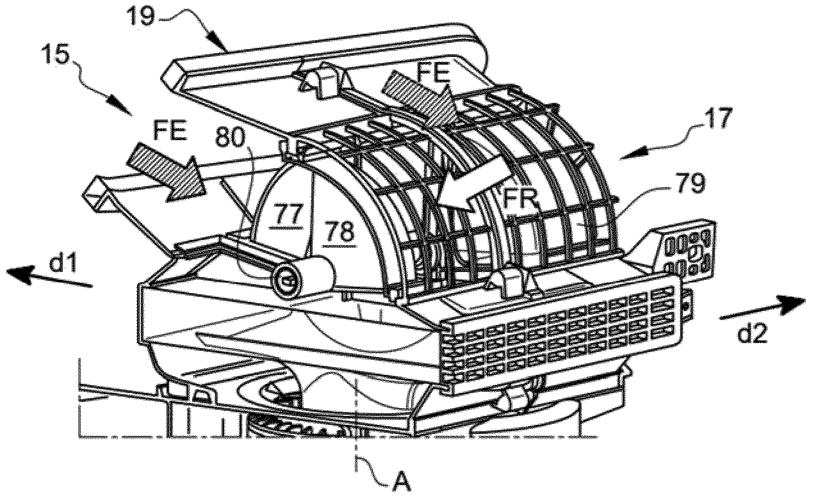

HEATING, VENTILATION AND/OR AIR-CONDITIONING DEVICE FOR A MOTOR VEHICLE

CROSS-REFERENCE TO RELATED APPLICATIONS

This application is filed under 35 U.S.C. § 371 U.S. National Phase of International Application No. PCT/EP2021/059486 filed Apr. 13, 2021 (published as WO2021209409), which claims priority benefit to French Application No. 2003802 filed on Apr. 15, 2020, the disclosures of which are herein incorporated by reference in their entirety.

TECHNICAL FIELD

The present invention relates to a heating, ventilation and/or air-conditioning device for a motor vehicle and to a motor vehicle comprising such a heating, ventilation and/or air-conditioning device.

BACKGROUND OF THE INVENTION

A motor vehicle is commonly equipped with a heating, ventilation and/or air-conditioning device to regulate the aerothermal parameters of an airflow distributed toward the inside of the vehicle interior. The heating, ventilation and/or air-conditioning device generally comprises a housing delimited by partitions, in which openings are provided, including at least one air inlet and at least one air outlet.

In a known manner, the housing houses a blower to circulate the flow of air from the air inlet to the air outlet. The housing also houses heat treatment components for heating and/or cooling the flow of air prior to its distribution inside the vehicle interior. By way of example, the heat treatment components can comprise an evaporator, which is intended to cool and dehumidify the flow of air passing through it, as well as a radiator, possibly associated with an additional radiator, which is intended to heat the flow of air flowing through it.

The heating, ventilation and/or air-conditioning device, also known by the abbreviation HVAC, can be supplied either with air external to the vehicle (also referred to as fresh air), or with recirculated air, which is to say air derived from the vehicle interior. In the known way, a blower is used to cause the airflow to circulate. This can be the flow of fresh or new air coming from outside the vehicle, or the flow of recirculated air coming from the vehicle interior, or else a mixture of the exterior-air and recirculated-air airflows.

It is important to be able to separate the airflows (exterior air—recirculated air), particularly when the airflows are passing through the heating, ventilation and/or air-conditioning device, according to the needs of the occupants of the vehicle, or in other words, when the airflows are being thermally conditioned.

Specifically, since the recirculated air is already at a temperature close to the setpoint temperature that is to be achieved, it is thus possible to achieve the temperature desired by the user rapidly. However, the recirculated air is more laden with moisture than the air coming from outside the vehicle, which means that if the recirculated air is directed in the vicinity of the windshield, via ventilation openings situated in front of the driver or in front of the front-seat passenger, for example, or directly onto the windshield, the moisture contained in the recirculated air condenses on the windshield and creates fogging.

The outlet comprises a plurality of ducts that distribute the airflows to nozzles opening into the various zones of the vehicle interior, and notably including the defrosting outlet that carries the airflow toward the defrosting nozzle for defogging the windshield, the ventilation duct that carries the airflow toward the lateral/central ventilation nozzle for cooling/warming the passengers of the vehicle, and the footwell duct that directs the airflow towards the footwell nozzle for cooling/warming the feet of the front/rear passengers of the vehicle. There can also be a duct dedicated to the rear-seat passengers of the vehicle.

One known solution is to thermally condition the exterior-air airflow and to send it into the interior in the vicinity of the windshield or directly onto the latter, and to thermally condition the recirculated-air airflow to send it into the interior away from the windshield, through the other ventilation openings such as ventilation opening outlets situated at the feet of the driver or front-seat passenger. This is a mode of operation referred to as "double layer".

However, it is found in these known devices that too much of hot air that has passed through the radiator is directed toward the ventilation outlet with the result that the temperature of the airflow for the footwell outlet is equal to the temperature of the airflow for the ventilation outlet. This results in a reduction in thermal comfort where it is generally preferable to have a higher temperature for the footwell than for the ventilation.

The aim of the invention is to overcome this drawback.

BRIEF SUMMARY OF THE INVENTION

For this purpose, the invention proposes a heating, ventilation and/or air-conditioning device for a motor vehicle, comprising a housing, said housing comprising:

- a first flow duct for a first airflow;
- a second flow duct for a second airflow;
- a separation partition arranged inside the housing so as to separate the first flow duct from the second flow duct;
- a first heat exchanger arranged in the first flow duct and in the second flow duct, with said heat exchanger being common to the two flow ducts;
- notably a second heat exchanger arranged downstream, with respect to the flow of an airflow, of the first heat exchanger and arranged within one single flow duct;
- a first door arranged downstream of the second heat exchanger; said door being able to come into abutment in one extreme position against the separation partition or against the second heat exchanger;
- an airflow guide wall arranged within the first flow duct downstream of the first heat exchanger and directing the first airflow toward the first door;

characterized in that the housing has a space between the airflow guide wall and the first door so that the first door is not able to come into abutment against the airflow guide wall.

The invention thus makes it possible to ensure that the airflow is guided toward the door that is able to direct the airflow toward the footwell outlet. However, the space created between the airflow guide wall and the door makes it possible to maintain the usual modes of operation and supply hot air to the ventilation and/or defrosting outlets while at the same time supplying the footwell outlet with hot air.

According to one of the aspects of the invention, the heating, ventilation and/or air-conditioning device comprises a third heat exchanger arranged upstream of the first heat exchanger with respect to the flow of an airflow, the third heat exchanger being arranged in the first flow duct and in the second flow duct, said heat exchanger being common to the two flow ducts.

According to one of the aspects of the invention, the door pivots between two extreme positions, a first extreme position in which said door comes into abutment against the separation partition and/or the second heat exchanger, and a second extreme position in which said door comes into abutment against a wall of the housing.

According to one of the aspects of the invention, the first door pivots into an intermediate position situated between the two extreme positions with the wall for guiding an airflow extending substantially in one direction and the first door comprising a vane extending in one direction; in said intermediate position said vane being in the continuation of the airflow guide wall.

According to one of the aspects of the invention, the first door pivots into an intermediate position situated between the two extreme positions with the wall for guiding an airflow extending in a first direction P and the first door comprising a vane which extends in a second direction V; the first and second directions P and V being substantially aligned in said intermediate position.

According to one of the aspects of the invention, in said intermediate position, the space between the end of the airflow guide wall and the end of the first door is between 5 and 25 mm, preferably between 10 and 15 mm.

According to one of the aspects of the invention, the first door is able to close off an inlet opening of an outlet duct when said door is positioned in the second extreme position.

According to one of the aspects of the invention, the first flow duct of an airflow and the second flow duct of an airflow each comprise a bypass path bypassing the first heat exchanger, the bypass paths being arranged on each side of the first heat exchanger.

According to one of the aspects of the invention, a second door, notably a door of the butterfly type, is arranged within the first flow duct for an airflow and a third door, notably of the sliding vane type, is arranged within the second flow duct for an airflow, said doors being arranged between the first and the third heat exchanger so as to direct each respective airflow through the corresponding bypass path and/or through the first heat exchanger.

According to one of the aspects of the invention, the first airflow flow duct further comprises a fourth door, notably of butterfly type, arranged within the corresponding bypass path.

According to one of the aspects of the invention, the housing comprises a screen element arranged at one end of the door, said screen element being of a shape that complements the travel of the door and extends at least in part over part of the travel of the door.

According to one of the aspects of the invention, the door is of the butterfly type and the screen element is arranged in the upstream part of the housing, with respect to the flow of an airflow, with respect to the door.

According to one of the aspects of the invention, the housing comprises a second screen element arranged at the other end of the door.

According to one of the aspects of the invention, the first screen element extends over at least 10% of the travel of the door, preferably between 20% and 50% of the travel of the door.

According to one of the aspects of the invention, the second screen element extends over at least 5% of the travel of the door, preferably between 10% and 30% of the travel of the door.

The invention also relates to a motor vehicle comprising a heating, ventilation and/or air-conditioning device as described above.

According to one of the aspects of the invention, said duct corresponds to the footwell outlet and is configured to supply air to the footwell zone of the vehicle interior.

BRIEF DESCRIPTION OF THE DRAWINGS

It will be understood that the above collection of features and configurations is in no way limiting. Further features, details and advantages of the invention will become more clearly apparent from reading the detailed description given below, and several exemplary embodiments that are given by way of non-limiting indication, with reference to the attached schematic drawings, in which:

FIG. 1 is a cross section of a profile view illustrating the heating, ventilation and/or air-conditioning device according to the invention in one mode of operation;

FIG. 2 is a detailed drawing of FIG. 1 illustrating the heating, ventilation and/or air-conditioning device in another mode of operation;

FIG. 3 is a schematic profile view illustrating another part of the heating, ventilation and/or air-conditioning device; and FIG. 4 is a perspective view illustrating another part of the heating, ventilation and/or air-conditioning device.

DETAILED DESCRIPTION OF THE INVENTION

FIG. 1 illustrates a heating, ventilation and/or air-conditioning device 2 according to the invention comprising a housing 4, which houses components for heat-treating the airflow that is intended to be distributed into the vehicle interior. The housing 4 comprises a first flow duct 4*a* for a first airflow Fa, and a second flow duct 4*b* for a second airflow Fb.

According to the invention, the housing 4 comprises a separation partition 5 arranged inside the housing 4 so as to separate the first flow duct 4*a* from the second flow duct 4*b*.

The heat treatment components comprise a first heat exchanger 6, for example a radiator, intended to heat part of the airflow circulating in the heating, ventilation and/or air-conditioning device 2. The first heat exchanger 6 is arranged in the first flow duct 4*a* and in the second flow duct 4*b*, with said heat exchanger 6 being common to the two flow ducts 4*a*, 4*b*.

The heat treatment components can further comprise a second exchanger 8, corresponding to an electric radiator intended to warm the airflow more quickly, notably when the vehicle is being started. The second heat exchanger 8 is arranged downstream, with respect to the airflow, of the first heat exchanger 6. The second heat exchanger 8 is arranged within a single flow duct, in this instance the second exchanger 8 is arranged exclusively within the second flow duct 4*b*.

The heat treatment components also comprise a third heat exchanger 10, for example an evaporator, arranged upstream of the first heat exchanger 6 with respect to the direction of flow of the airflows. The third heat exchanger 10 is intended to cool and dehumidify all of the airflow circulating in the heating, ventilation and/or air-conditioning device 2. The third heat exchanger 10 is arranged in the first flow duct 4*a* and in the second flow duct 4*b*, with said heat exchanger 10 being common to the two flow ducts 4*a*, 4*b*.

The airflow is introduced into the housing 4 via an inlet (not illustrated) and is then directed toward an outlet after having been heat-treated by the heat exchangers 6, 8, 10, by means of a blower (not illustrated).

The outlet comprises several ducts distributing the airflows to nozzles opening into different zones of the vehicle interior. The outlet notably comprises a first outlet duct 12 directing the airflow toward the footwell nozzle making it possible to warm the feet of the front and possibly rear passengers of the vehicle. The outlet also comprises a second outlet duct 14 carrying the airflow toward the defrost nozzle, thus making it possible to defog the windshield. The outlet comprises a third outlet duct 16 conveying the airflow toward the lateral/central ventilation nozzle, thus making it possible to cool/heat the front passengers of the vehicle. The outlet can also comprise a fourth outlet duct 18 for guiding the airflow toward the rear zone of the vehicle, making it possible to cool/heat the rear passengers of the vehicle. Each outlet duct 12, 14, 16, 18 comprises an access opening that can be at least partially closed off by a shut-off door.

According to the invention, the heating, ventilation and/or air-conditioning device 2 comprises a first door 20 arranged downstream of the second heat exchanger 8 and coming into abutment in one extreme position against the separation partition 5 or against the second heat exchanger 8. As illustrated in FIG. 1, the first door 20 is of the butterfly type, namely it comprises a rotation axle arranged at the center of a vane P or a rotation axle arranged between two vanes. The first door 20 is arranged at the first outlet duct 12. In other words, the first door 20 is arranged in such a way that it can at least partially close off the inlet opening of the first outlet duct 12. As illustrated in FIG. 1, the first door 20 is of the butterfly type with a rotation axle 20*c* arranged between two vanes 20*a*, 20*b* which in this instance lie in two distinct planes. Quite obviously, the two vanes can lie in one and the same plane. A first vane 20*a* is able to close off or uncover access to the first outlet duct 12. The second vane 20*b* is able to guide the airflow leaving the first or second heat exchanger 6, 8.

The first door 20 pivots between two extreme positions, a first extreme position in which the first door 20 and, more specifically the second vane 20*b*, comes into abutment against the separation partition 5 and/or the second heat exchanger 8, and a second extreme position in which the first door 20, and more specifically the second vane 20*b*, comes into abutment against a wall of the housing 4. Of course, the first door 20 is capable of adopting any intermediate position between these two extreme positions.

In the first extreme position as illustrated in FIG. 2, the first door 20, and notably the second vane 20*b*, comes into abutment against the separation partition 5 whereas the first vane 20*a* comes into abutment against a wall of the housing 4, notably a wall of the first outlet duct 12, so that the flowrate of air that can circulate in the first outlet duct 12 is at a maximum.

In the second extreme position illustrated in FIG. 3, the first door 20, and notably the second vane 20*b*, comes into abutment against a wall of the housing 4, whereas the first vane 20*a* completely closes off the first outlet duct 12, so that no airflow is able to circulate in the first outlet duct 12.

According to the invention, the heating, ventilation and/or air-conditioning device 2 further comprises an airflow guide wall 22 arranged in the first flow duct 4*a* for an airflow Fa and arranged downstream, with respect to the flow of an airflow, of the first heat exchanger 6. The airflow guide wall 22 directs the first airflow Fa towards the first door 20.

Thus, according to the invention, the hot first airflow Fa which has passed through the first heat exchanger 6, is directed toward the first door 20 and therefore toward the first outlet duct 12 aimed at the footwell zone of the vehicle interior.

As a result of this orientation, the majority of the flowrate of the heated first airflow Fa is directed toward the footwell outlet duct 12.

However, according to the invention, it is the majority, but not all, of the flowrate of the heated first airflow Fa that is directed toward the footwell outlet duct 12. Specifically, there is always a proportion of the first airflow Fa that is able to flow toward the second and/or third outlet duct 14, 16.

For that purpose, the heating, ventilation and/or air-conditioning device 2 according to the invention, and notably the housing 4, has a space 24, or gap, between the airflow guide wall 22 and the first door 20 so that the first door 20 is not able to come into abutment against the airflow guide wall 22. In other words, according to the invention, the first door 20 is configured so that the first door 20 cannot come to bear on the airflow guide wall 22.

As was seen earlier, the first door 20 pivots into an intermediate position I as illustrated in FIG. 1 which is situated between the two extreme positions. The airflow guide wall 22 extends substantially in a first direction P and the first door, and notably the second vane 20*b*, extends substantially in a second direction V. As illustrated in FIG. 1, the first and second directions P and V are substantially aligned in this intermediate position. In other words, the second vane 20*b* is in the continuation of the airflow guide wall 22, while leaving a space 24 between the two elements.

In said intermediate position, the space 24 between the end of the airflow guide wall 22 and the end of the first door 20, and notably the end of the second vane 20*b*, is between 5 and 25 mm, preferably between 10 and 15 mm.

Thus, the existence of this gap 24 ensures that part of the first airflow Fa that has passed through the first heat exchanger 6 can always be conveyed towards the second and/or third outlet duct 14, 16.

The first flow duct 4*a* for the first airflow Fa and the second flow duct 4*b* for the second airflow Fb each comprise a bypass path 26, 28 bypassing the first heat exchanger 6, the bypass paths 26, 28 being arranged on each side of the first heat exchanger 6.

According to the invention, a second door 30 of the butterfly type is arranged within the first flow duct 4*a* for the first airflow Fa and a third door 32 of the sliding vane type is arranged within the second flow duct 4*b* for the second airflow Fb, said doors being arranged between the first 6 and the third 10 heat exchanger so as to direct each respective airflow Fa, Fb through the corresponding bypass path 26, 28 and/or through the first heat exchanger 6.

In other words, the second door 30 of butterfly type pivots between two extreme positions and is able to adopt any intermediate position, a first extreme position in which the second door 30 completely shuts off the passage for the airflow Fa to access the first heat exchanger 6, and a second extreme position in which the second door 30 uncovers to the maximum extent the passage for the airflow Fa to access the first heat exchanger 6. The first flow duct 4*a* for the first airflow Fa further comprises another door, and therefore a fourth door 34, likewise of butterfly type, arranged in the corresponding bypass path 26 bypassing the first heat exchanger 6. The fourth door 34 pivots between two extreme positions and is able to adopt any intermediate position, a first extreme position in which the fourth door 34 completely shuts off the bypass path 26 bypassing the first heat exchanger 6, and a second extreme position in which the fourth door 34 opposes the least the flowing of the first airflow Fa within the bypass path 26.

The third door 32 of the sliding vane type slides between two extreme positions and is able to adopt any intermediate position, a first extreme position in which the third door 32 completely shuts off the passage for the airflow Fa to access the first heat exchanger 6, and a second extreme position in which the third door 32 completely shuts off the corresponding bypass path 28.

Obviously the invention is not limited to the type of door for the first, second, third or fourth door 20, 30, 32, 34. Each door can correspond to a butterfly door, drum door, end-hinged flag-like door (with the rotation axle positioned at one end of a vane) or a sliding vane door.

As explained previously, each outlet duct 12, 14, 16, 18 comprises an associated shut-off door which allows each airflow Fa, Fb either to flow or not to flow within the outlet duct.

The first door 20 is associated with the first outlet duct 12. A fifth door 36, in this instance of the end-hinged flag-like type, is associated with the second outlet duct 14 that directs the air toward the defrosting nozzle near the windshield of the vehicle. The fifth door 36 is able to fully close off the second outlet duct 14. A sixth door 38, in this instance of the drum door type, is associated with the third outlet duct 16 that directs the air toward the central/lateral ventilation nozzle. The sixth door 38 is such that it is not able to fully close off the third outlet duct 16. Specifically, the sixth door 38 has cutouts (not illustrated) on its lateral sides so as to always ensure an air leak representing of the order of 10% of the maximum flowrate even when the sixth door 38 is in the extreme position of closing off the third outlet duct 16. Furthermore, a seventh door 40, in this instance of the butterfly type, is associated with the fourth outlet duct 18 that directs the air toward the ventilation nozzle for the passengers in the rear of the vehicle. The seventh door 40 is able to fully close off the fourth outlet duct 18.

The structure of the sixth door 38 makes it possible to ensure that an airflow can always be directed toward the side windows of the vehicle and allow these to be defrosted or defogged. This is advantageous particularly in the defrosting mode, where the sixth ventilation door 38 is in the extreme shut-off position but the windows of the vehicle can still be defrosted or defogged.

The first, fifth, sixth and seventh doors are referred to as distribution doors or flaps, and the second, third and fourth doors are referred to as the mixing doors or flaps.

The heating, ventilation and/or air-conditioning device 2 according to the invention can comprise a mechanism for synchronizing the doors, in which the flap of the seventh door 40 can be connected in rotation to the flap of the sixth door 38 for example by a link rod.

Such an arrangement of the heating, ventilation and/or air-conditioning device 2 according to the invention means that several modes of operation as described herein below can be exploited. Only the distribution doors or flaps, and the mixing doors or flaps dependent on the temperature set-points indicated by the front and/or rear passengers will be described.

In footwell mode, as illustrated in FIG. 2, the first door is in the position in which the first outlet duct 12 is open, or in other words the first door 20 is in abutment against the separation wall 5 and/or against the second heat exchanger 8. The fifth door 36 is in the partial shut-off position (80% closed), the sixth door 38 is in the position in which the third outlet duct 16 is shut off, with air leaks representing up to 10% of the maximum flowrate and the seventh door is in the position in which the fourth outlet duct 18 is completely shut off.

In double layer mode, the first door 20 is in an intermediate position I in which the second vane 20*b* is in the continuation of the guide wall 22 that guides the heated first airflow Fa, as illustrated in FIG. 1. The fifth door 36 is in the position in which the second outlet duct 14 is shut off and the sixth door 38 and seventh door 40 are in an intermediate open position, which is to say a position between that in which each corresponding outlet duct 16, 18 is shut off and that in which same is open, although the sixth door 38 can be in the wide-open position.

In footwell/defrost mode, the first door 20 and the fifth door 36 are in an intermediate position and the sixth door 38 and seventh door 40 are in the position in which each corresponding outlet duct 16, 18 is shut off, with air leaks in the case of the sixth door 38.

In ventilation mode the sixth door 38 and seventh door 40 are in the position in which each corresponding outlet duct 16, 18 is open and the first door 20 and fifth door 36 are in the position in which each corresponding outlet duct 12, 14 is shut off.

In defrost mode only the fifth door 36 is in the position in which the outlet duct 14 is open, the other distribution doors are in the position in which each corresponding duct is shut off.

The table which follows summarizes the various modes. For each mode, footwell, defrost, etc., there are two lines, the first line corresponding to the degree (percentage) of opening of the indicated door, where 100 corresponds to the maximum degree of opening, in other words the extreme position in which the door opposes the flow of an airflow the least, and 0 corresponds to the degree whereby the corresponding duct is shut off. The modes are recorded on the left and the doors are recorded according to their degree of opening and flowrate passing through these doors. The second line corresponds to the air flowrate circulating through the corresponding air duct (as a percentage of the total air flowrate).

| Mode | Opening of first door (20) Air flowrate in first outlet duct (12) (%) | Opening of fifth door (36) Air flowrate in second outlet duct (14) (%) | Opening of sixth/ seventh door (38, 40) Air flowrate in third and/or fourth outlet duct (16, 18) (%) |
|---|---|---|---|
| Footwell | 100 | 15/20 | 0 |
| | 70/60 | 20 | 10/20 |
| Double layer | ~50 | 0 | ~100 |
| | 60 | 0 | 40 |
| Footwell/ | ~100 | ~100 | 0 |
| Defrost | 45/40 | 45/40 | 10/20 |
| Ventilation | 0 | 0 | 100 |
| | 0 | 0 | 100 |
| Defrost | 0 | 100 | 0 |
| | 0 | 90/80 | 10/20 |

Thus it is possible according to the invention to have several modes of operation and have more hot air directed toward the footwells.

FIG. 3 illustrates an air inlet housing and a blower (or motor-fan unit) namely with a single impeller, in other words, a bladed wheel 54 able to be rotated about an axis A. The heating, ventilation and/or air-conditioning device 2 comprises a tubular member 56 able to delimit a first air circulation channel 58 allowing the flow of a first airflow intended to pass through a first axial part of the impeller 54*b* and a second air circulation channel 60 allowing the flow of a second airflow intended to pass through a second axial part of the impeller 54*a*. The tubular member 56 is mounted at the site of a first end of said impeller 54 and delimits an internal space, or volume, forming at least part of the first air circulation channel 58, with the second air circulation channel 60 extending outside the tubular member 56. The heating, ventilation and/or air-conditioning device 2 further comprises an air inlet housing covering the first end of the impeller 54 and the tubular member 56. The air inlet housing comprises guidance components able to direct a first airflow into the first air circulation channel 58, and able to direct a second airflow into the second air circulation channel 60. The axial parts of the impeller 54*a*, 54*b* can be made, for example, with reference to the vertical axis of the vehicle, when the heating, ventilation and/or air-conditioning device 2 is installed in the vehicle.

To this end, the air inlet housing can for example comprise a first and a second air inlet opening, one for the recirculated air and one for the fresh air, and three drum doors with coaxial axes of rotation. The central drum door is arranged to allow aeraulic communication between the air inlets and the first air circulation channel 58. The two lateral drums are arranged to allow aeraulic communication between the air inlet openings and the second air circulation channel 60. The air inlet housing 14 can further comprise an air filter intended to be passed through by the first and the second airflow.

The impeller 54 is arranged in a blower housing 62, the outlet of which comprises the two flow ducts 4*a*, 4*b* separated by the separation wall 13 corresponding to part of the separation partition 5. In other words, the first air circulation channel 58 directs the airflow toward a first axial part of the impeller 54*b* and thus opens into the second flow duct 4*b*, whereas the second air circulation channel 60 directs the airflow toward the second axial part 54*a* of the impeller 54 and thus opens into the first flow duct 4*a*.

The air blower, i.e. the one or more bladed wheels 54, is contained in a spiral-shaped portion of the housing, commonly referred to as the blower housing 62. The airflows drawn in by the one or more bladed wheels 54 are directed toward the walls of the blower housing 62 and thus closely follow the circular trajectory defined by these walls. The blower housing 62 then has a blower housing outlet in the form of a straight duct so that the airflows exiting the blower housing 62 follow this same direction.

The part of the housing 4 that is positioned between the outlet of the blower housing 62 and the distribution is commonly referred to as the divergent. The divergent corresponds to a channel in which the airflow exiting the blower housing 62 is routed as far as the third heat exchanger 10, in this case the evaporator 10.

The heating, ventilation and/or air-conditioning device 2 comprises a separation partition 5 separating, or delimiting, the two flow ducts 4*a*, 4*b* in relation to one another. This separation partition can be made as one piece and extend within the heating, ventilation and/or air-conditioning device 2 with orifices to allow the various heat exchangers 6, 8, 10 to be introduced, or the separation partition can be in several parts or modules. There can be a first part 13 extending between the blower and the evaporator 10, a second part 5 extending between the third 10 and the first 6 heat exchanger, a third extending above the second heat exchanger 8.

The separation partition 5 according to the invention is not restricted to any particular shape. The separation partition corresponds to an element able to separate or delimit the two flow ducts 4*a*, 4*b*. As illustrated in FIGS. 1 and 3, the first part corresponds to a planar wall. The second part here corresponds to a unit, which is to say a collection of walls, which define a shape that is uneven or non-planar, with abutment elements against which the second mixing door 30 can come to bear or between spaces designed to at least partially accommodate the third mixing door 32. The third part corresponds to an omega-shaped wall with a space to house the second heat exchanger 8 and an abutment element against which the first door 20, and notably the second vane 20*b* comes to bear.

The heating, ventilation and/or air-conditioning device 2 can comprise an air inlet housing 19 as illustrated in FIG. 4. In this instance, the air inlet housing 19 comprises at least two distinct air inlets 15, 17 extending across a width (d2) of the air inlet housing, and air guiding members 77, 78, 79 which are configured to direct at least an airflow intended to be admitted into the air inlet housing 19.

The air guiding members comprise at least three coaxial doors 77, 78, 79, these being a central door 77 and two lateral doors 78, 79 arranged on each side of the central door 77, said coaxial doors 77, 78, 79 being arranged between said two distinct air inlet openings 15, 17 of the air inlet housing 19, such as to be able to move about a single pivot axle 80. The central door 77 extends over a portion of said width of the air inlet housing 19 which is greater than or equal to the portion of width over which the two lateral doors 78, 79 extend.

Said coaxial doors 77, 78, 79 are of the drum door type and are each arranged with the ability to move between a first extreme position, in which said door 77, 78, 79 closes off a first air inlet 15, and a second extreme position in which said door 77, 78, 79 closes off the second air inlet 17.

In defog mode, the central door 77 needs to be in the first extreme position of shutting off the second air inlet 17. The lateral doors 78, 79, need to be in the second extreme position of shutting off the first air inlet 15.

In that way, the fresh air airflow FE can flow through the blower through the first air inlet 15 to be guided toward the inside of the tubular member 56 and arrive at the first axial part of the impeller 54*b* and thus emerge in the second flow duct 4*b*, and the recirculating airflow FR can also flow through the blower through the lateral doors 78, 79 which guide the recirculating airflow FR toward the outside of the tubular member 56 in order to reach the second axial part of the impeller 54*a* and thus emerge in the first flow duct 4*a*.

Furthermore, the housing 4 comprises a screen element 42 arranged at one end of the fourth door 34. Said screen element 42, commonly known as a progressivity tip, is of a shape that complements the travel of the fourth door 34 and extends at least in part over part of the travel of the door. In other words, the housing 4 comprises a screen element 42, or mask, which closely follows the curved trajectory of the fourth door 34. It can also be said that the screen element 42 is at least partially concave, with the fourth door moving within the concave part. Specifically, the fourth door 34 corresponds to a butterfly door pivoting about a rotation axle arranged between two vanes or at the center of a single vane so that the vane or vanes adopt a circular trajectory and pivot from one extreme position in which they come into abutment against the housing 4 to prevent the airflow from flowing along the bypass path 26, into another extreme position in which they oppose the flow of the airflow the least.

By opening, or pivoting by a few degrees, the fourth door 34, this creates an inrush of air where cold air is drawn toward the distribution, this being something that does not encourage good mixing with the hot air with the result that the defrosting outlet or the ventilation outlet is cooler than the setpoint temperature given by the occupants of the vehicle.

The screen element 42 therefore makes it possible to generate a dead zone so that the quantity of cold air can be better calibrated for temperature progressivity.

The fourth door 34 is of the butterfly type and the screen element 42 is arranged in the upstream part of the housing 4, with respect to the flow of an airflow, with respect to the fourth door 34. In other words, the screen element 42 is arranged between the fourth door 34 and the third heat exchanger 10, with respect to the flow of an airflow.

The housing 4 comprises a second screen element 45 arranged at the other end of the door 34. In the same way, the second screen element is of a shape that complements the travel of the door vane, or in other words is at least partially concave, so that it too generates a dead zone.

As illustrated in FIG. 1, the second screen element 45 is formed by a set of walls that are joined together or formed as one piece and also form the guide wall 22.

The first screen element 42 extends over at least 10% of the travel of the door, preferably between 20% and 50% of the travel of the door. In other words, if the fourth door 34 pivots in an angular range comprised between [0°,100° ], then in such a case, the concave part of the screen element 42 extends at least in the angular range comprised between [0°,10° ], preferably between [0°, 20° ] or even up to an angular range of between [0°,50° ] and all intermediate values.

The second screen element 45 extends over at least 5% of the travel of the door, preferably between 10% and 30% of the travel of the door. In other words, the concave part of the second screen element 45 extends at least in the angular range comprised between [0°,10° ], preferably between [0°, 10°] or even up to an angular range of between [0°,30°] and all intermediate values.

What is claimed is:

1. A heating, ventilation and/or air-conditioning (HVAC) device for a motor vehicle, the HVAC device comprising:
- a housing, the housing including:
  - a first flow duct configured to circulate a first airflow;
  - a second flow duct configured to circulate a second airflow; and
  - a separation partition-configured to separate the first flow duct from the second flow duct;
- a first heat exchanger arranged within both the first flow duct and the second flow duct, the first heat exchanger being common to the first and second flow duct;
- a second heat exchanger arranged downstream of the first heat exchanger and within either the first flow duct or the second flow duct;
- a first door arranged downstream of the second heat exchanger; and
- an airflow guide wall arranged within the first flow duct downstream of the first heat exchanger,
- wherein the airflow guide wall is configured to direct the first airflow toward the first door; and
- wherein the housing defines a space between the airflow guide wall and the first door such that the first door is prevented from abutting the airflow guide wall,
- wherein the first door pivots between two extreme positions and an intermediate position, including:
  - a first extreme position in which the first door abuts the separation partition or the second heat exchanger,
  - a second extreme position in which the first door abuts a wall of the housing, and
  - the intermediate position situated between the two extreme positions, the intermediate position cooperating with the airflow guide wall to guide an airflow extending substantially in a first direction, the first door including a vane extending in a second direction, wherein, in the intermediate position, the vane is aligned in continuation with the airflow guide wall;
- an outlet duct, wherein the first door is configured to close off an inlet opening of the outlet duct when the first door is positioned in the second extreme position.

2. The-HVAC device as claimed in claim 1, further comprising a third heat exchanger arranged upstream of the first heat exchanger, the third heat exchanger being arranged in both the first flow duct and the second flow duct, the third heat exchanger being common to the first and second flow duct.

3. The HVAC device as claimed in claim 1, wherein, in the intermediate position, the space is between 5 and 25 mm.

4. The HVAC device as claimed in claim 1, wherein the first flow duct and the second flow duct each include a bypass path bypassing the first heat exchanger, the bypass paths being arranged on opposite sides of the first heat exchanger.

5. The HVAC device as claimed in claim 4, wherein a second door is arranged within the first flow duct and a third door is arranged within the second flow duct, the second and third doors being positioned between the first and third heat exchangers so as to direct-respective airflows through corresponding bypass paths and through the first heat exchanger.

6. The HVAC device as claimed in claim 5, wherein the first flow duct further includes a fourth door arranged in the bypass path of the first flow duct.

7. A motor vehicle, comprising:
- a heating, ventilation and/or air-conditioning (HVAC) device for a motor vehicle, the HVAC including:
  - a housing, the housing including:
    - a first flow duct configured to circulate a first airflow;
    - a second flow duct configured to circulate a second airflow; and
    - a separation partition configured to separate the first flow duct from the second flow duct;
  - a first heat exchanger arranged within both the first flow duct and the second flow duct, wherein the first heat exchanger is common to the first flow duct and the second flow duct;
  - a second heat exchanger arranged downstream of the first heat exchanger and within either the first flow duct or the second flow duct;
  - a first door arranged downstream of the second heat exchanger; and
  - an airflow guide wall arranged within the first flow duct downstream of the first heat exchanger;
  - wherein the airflow guide wall is configured to direct the first airflow toward the first door;
  - wherein the housing defines a space between the airflow guide wall and the first door such that the first door is prevented from abutting the airflow guide wall;
  - wherein the first door pivots between two extreme positions and an intermediate position, including:
    - a first extreme position in which the first door abuts the separation partition or the second heat exchanger;
    - a second extreme position in which the first door abuts a wall of the housing; and the intermediate position situated between the two extreme positions, the intermediate position cooperating with the airflow guide wall to guide an airflow extending substantially in a first direction, the first door including a vane extending in a second direction, wherein, in the intermediate position, the vane is aligned in continuation with the airflow guide wall;

the HVAC device further including an outlet duct;

wherein the first door is configured to close off an inlet opening of the outlet duct when the first door is positioned in the second extreme position; and wherein the outlet duct corresponds to the footwell outlet and is configured to supply air to the footwell zone of the vehicle interior.

* * * * *